United States Patent
Tamada et al.

(10) Patent No.: US 10,096,333 B2
(45) Date of Patent: Oct. 9, 2018

(54) MAGNETIC RECORDING MEDIUM

(71) Applicant: FUJIFILM Corporation, Minato-Ku, Tokyo (JP)

(72) Inventors: Yoshinori Tamada, Minami-ashigara (JP); Masahide Sato, Minami-ashigara (JP); Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/754,918

(22) Filed: Jun. 30, 2015

(65) Prior Publication Data
US 2015/0380037 A1 Dec. 31, 2015

(30) Foreign Application Priority Data

Jun. 30, 2014 (JP) .................... 2014-135130
Jun. 29, 2015 (JP) .................... 2015-129391

(51) Int. Cl.
*G11B 5/706* (2006.01)
*G11B 5/708* (2006.01)
*G11B 5/70* (2006.01)

(52) U.S. Cl.
CPC ............ *G11B 5/708* (2013.01); *G11B 5/7013* (2013.01)

(58) Field of Classification Search
CPC ............................. G11B 5/7013; G11B 5/708
See application file for complete search history.

(56) References Cited

U.S. PATENT DOCUMENTS

| 5,330,669 | A * | 7/1994 | Yasuda | C08G 18/0819 252/62.54 |
| 2003/0049490 | A1* | 3/2003 | Masaki | B82Y 25/00 428/848.3 |
| 2010/0246073 | A1* | 9/2010 | Katayama | G11B 5/7085 360/324 |
| 2010/0323222 | A1* | 12/2010 | Nakashio | G11B 5/708 428/800 |

FOREIGN PATENT DOCUMENTS

| JP | 2007-200547 A | 8/2007 |
| JP | 2010-231843 A | 10/2010 |
| JP | 2011-028826 A | 2/2011 |

OTHER PUBLICATIONS

Office Action dated Dec. 20, 2016, from the Japanese Patent Office in counterpart Japanese Application No. 2015-129391.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises a nonmagnetic layer comprising nonmagnetic powder and binder on a nonmagnetic support, and a magnetic layer comprising ferromagnetic powder and binder on the nonmagnetic layer, wherein the magnetic layer further comprises carbon black, and a state in which the carbon black is present, as observed in a reflection electron image of a surface of the magnetic layer obtained by a scanning electron microscope, satisfies condition 1 and condition 2 below:

condition 1: a number of carbon black particles with a particle size of greater than or equal to 140 nm is greater than or equal to 30 per 1,000 $\mu m^2$ of area; and condition 2: a number of carbon black particles with a particle size of greater than or equal to 220 nm is less than or equal to 10 per 1,000 $\mu m^2$ of area.

20 Claims, No Drawings

MAGNETIC RECORDING MEDIUM

CROSS-REFERENCE TO RELATED APPLICATIONS

This application claims priority under 35 U.S.C 119 to Japanese Patent Application No. 2014-135130 filed on Jun. 30, 2014 and Japanese Patent Application No. 2015-129391 filed on Jun. 29, 2015. Each of the above applications is hereby expressly incorporated by reference, in its entirety.

BACKGROUND OF THE INVENTION

Field of the Invention

The present invention relates to a magnetic recording medium.

Discussion of the Background

In recent years, means of rapidly transmitting information have undergone marked development. The transmission of data and images comprising huge amounts of information has become possible. With improvement in the techniques used to transmit these data has come a need to achieve higher recording densities in the magnetic recording media that are used to record, reproduce, and store information.

Increasing the surface smoothness of magnetic recording media and reducing the spacing loss are effective ways to achieve good electromagnetic characteristics during the reproduction of information recorded at high density. To this end, dispersing agents have been added to the magnetic layer and nonmagnetic layer for some time to enhance the dispersion of ferromagnetic powder in the magnetic layer and/or the dispersion of nonmagnetic powder in the nonmagnetic layer positioned beneath the magnetic layer (for example, see Japanese Unexamined Patent Publication (KOKAI) No. 2007-200547, which is expressly incorporated herein by reference in its entirety).

SUMMARY OF THE INVENTION

Employing narrower recording track widths and increasing the recording density in the width direction are effective ways of achieving higher recording densities. To this end, increasing the running stability of magnetic recording media, and specifically, the straight running stability (the ability to run in the longitudinal direction without significant swerving) are required. A further description of this point will be given below. A magnetic recording medium with good straight running stability is able to reproduce at high output a signal that has been recorded at a narrow track width. However, when a magnetic recording medium has poor straight running stability and ends up swerving considerably during running (during reproduction), a drop in reproduction output occurs due to being off track and it becomes difficult to achieve a good signal-to-noise ratio (SNR). Thus, in such a case, to prevent straying off track, it becomes necessary to set a wide recording track width. This then precludes improvement of the recording density in the width direction. Accordingly, to achieve higher density recording, there is a need to enhance the straight running stability of magnetic recording media and achieve stable running.

An aspect of the present invention provides for a magnetic recording medium that is capable of stable running.

An aspect of the present invention relates to a magnetic recording medium, which comprises a nonmagnetic layer comprising nonmagnetic powder and binder on a nonmagnetic support, and a magnetic layer comprising ferromagnetic powder and binder on the nonmagnetic layer, wherein the magnetic layer further comprises carbon black; and a state in which the carbon black is present, as observed in a reflection electron image of a surface of the magnetic layer obtained by a scanning electron microscope, satisfies condition 1 and condition 2 below:

condition 1: a number of carbon black particles with a particle size of greater than or equal to 140 nm is greater than or equal to 30 per 1,000 $\mu m^2$ of area; and condition 2: a number of carbon black particles with a particle size of greater than or equal to 220 nm is less than or equal to 10 per 1,000 $\mu m^2$ of area.

The present inventors presume that the presence on the surface of the magnetic layer of carbon black in a state that satisfies both conditions 1 and 2 can contribute to enhancing the running stability, more specifically, the straight running stability, of the magnetic recording medium. The reason for this, while not entirely clear, is presumed by the present inventors to be the following.

Many of the compounds that are employed as dispersing agents in the magnetic layer and/or nonmagnetic layer are acidic compounds. When the surface of a magnetic recording medium comes into contact with a member constituting a magnetic recording reproduction device (drive), such as a guide roll, an electrochemical reaction may occur between the component (such as a metal component) constituting the guide roll within the drive and the acidic compound. The surface of the member is thought to undergo a physical change (such as surface roughening). Such partial physical may change to the surface of the member are presumed by the present inventors to compromise the running stability (straight running stability) of the magnetic recording medium.

By contrast, in the above magnetic recording medium, the fact that the carbon black contained in the magnetic layer may adsorb the above acidic compound is thought to inhibit the above electrochemical reaction. The present inventors presume that this then can contribute to enhancing the straight running stability of the magnetic recording medium. The reason for satisfying condition 1 here is presumed to be so that the total specific surface area of the carbon black particles contained in the magnetic layer will be suitable for adsorbing the acidic compound to prevent the physical change in the member constituting the drive. The present inventors presume that condition 2 can be an index for carbon black not to be present on the surface of the magnetic layer in a state of coarse particles thought to cause a drop in running stability.

Based on the above, the above magnetic recording medium is presumed by the present inventors to achieve improved running stability, and more particularly, straight running stability. The carbon black that is observed as particles in a reflection electron image obtained by observation of the surface of the magnetic layer under a scanning electron microscope is normally comprised of high-order particles in the form of secondary or higher particles. That is, they can be aggregates of primary particles. In contrast, primary particles refer to independent particles that have not aggregated. Conditions 1 and 2 are specified based on the size of the particles of carbon black that are actually present in the magnetic layer. Generally, the adsorption capability of carbon black is thought to depend on the size of the primary particles of carbon black (the specific surface area of the primary particles). This is based on the idea that the compounds that are to be adsorbed will adsorb to the surface of primary particles. By contrast, in the magnetic layer of a magnetic recording medium, as set forth above, the carbon black is normally present as high-order particles in the form of secondary or higher particles. The present inventors presume that the reason why running stability can be improved as set forth above by specifying in conditions 1 and 2 the state in which the carbon black is present in the magnetic layer is that the acidic compounds can adsorb to the surface of the carbon black (normally, not primary particles of carbon black, but high-order particles in the form of secondary particles or the like) in the state in which it is actually present in the magnetic layer.

However, this is merely a presumption of the present inventors, and is not to be construed as limiting the present invention in any way.

Conditions 1 and 2 are measured by the following methods.

(1) A reflection electron image is obtained at an arbitrary point on the surface of the magnetic layer of the magnetic recording medium with a scanning electron microscope (magnification: 5,000-fold). By way of example, an FE-SEM S4800 made by Hitachi Corp. can be employed as the scanning electron microscope (SEM).

(2) The composition of portions determined to be particles based on the shade of the image in a 10 μm×10 μm area as the actual size (actual dimensions) of the reflection electron image obtained is analyzed and the carbon black particles are determined. The carbon black particles can be determined by known methods of composition analysis, such as energy dispersive X-ray spectrometry (EDS), auger electron spectroscopy (AES), and mapping of components in the surface of the magnetic layer by scanning electron microscopy. As an example, regions in which carbon atoms are detected at higher densities than in other regions (such as twice the density of other regions) can be determined to be carbon black particles. The difference in concentration between regions can be contrasted by spectral intensity or the like, for example.

(3) The pixels of the above reflection electron image can be binary processed to obtain a binary image. The binary processing can be conducted with known image analysis software. In the binary image obtained, the area of each of particles that have been determined to be carbon black particles is calculated. The areas of each of the particles that have been thus calculated can be approximated as circles, and the diameter of the circle obtained by approximation can be adopted as the particle size. The number of carbon black particles with a particle size greater than or equal to 140 nm and the number of carbon black particles with a particle size greater than or equal to 220 nm are each calculated.

(4) The above process is conducted at 10 arbitrary different spots on the surface of the magnetic layer. A determination is made as to whether condition 1 has been satisfied based on the total number of carbon black particles with a particle size of greater than or equal to 140 nm, and a determination is made as to whether condition 2 has been satisfied based on the total number of carbon black particles with a particle size of greater than or equal to 220 nm, that have been found in 10 spots (analysis region: actual size (actual dimensions) 10 μm×10 μm). Since the number of carbon black particles is counted as a cumulative particle number, the carbon black particles with a particle size of greater than or equal to 140 nm will be included in the carbon black particles with a particle size of greater than or equal to 220 nm. By way of example, WinROOF created by Mitani Corporation can be employed as the image analysis software.

In one embodiment, an acidic compound is contained in at least either the magnetic layer or the nonmagnetic layer.

In the present invention, the term "acidic compound" refers to a compound with an acid dissociation constant pKa of less than or equal to 7.00.

In one embodiment, the acidic compound is desirably one having an acid dissociation constant pKa of less than or equal to 6.00, preferably less than or equal to 5.00, and more preferably, less than or equal to 4.00. The pKa of the acidic compound is, for example, greater than or equal to 1.00.

The acid dissociation constant pKa of the compound can be measured by the following method at a liquid temperature of 25° C., for example.

A 60 mg quantity of the compound is dissolved in solvent in which the compound is soluble (for example, mixed solvent of tetrahydrofuran (THF) and water in a volumetric ratio of THF:water=6:4) to prepare a sample solution. The sample solution that has been prepared is subjected to neutralization titration with a 0.1 N (0.1 mol/L) aqueous solution of sodium hydroxide that has been factor calibrated. The droplet quantity (unit: mL) of the aqueous solution of sodium hydroxide is read at the neutralization point on a titration curve. The pH at half the droplet quantity of the amount of titrated aqueous solution of sodium hydroxide is adopted as the pKa of the compound.

By way of example, the following method can be used to extract the compound from the magnetic recording medium for pKa or pKb measurement, described further below.

The magnetic layer of a magnetic recording medium is dissolved in solvent (such as the above mixed solvent) in which the magnetic layer is soluble. The solvent contained in the sample solution containing the solute is distilled off using an evaporator. The residue following distillation is separated into individual components by chromatography. The separated components are measured to determine their pKa and pKb, described further below.

In one embodiment, the acidic compound is a phosphorus-based compound. In the present invention, the word "based" is used to mean "containing". Accordingly, the phosphorus-based compound is a compound that contains phosphorus (P).

In one embodiment, the acidic compound is a phosphonic acid-based compound. The term "phosphonic acid-based compound" means that the following phosphonic acid structure is present in the structure of the compound. The phosphonic acid structure can also be in the form of an alkali metal salt.

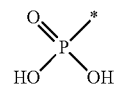

(In the above, *denotes the position of a bond with another structure constituting the compound.)

In one embodiment, at least either the magnetic layer or the nonmagnetic layer contains a basic compound. In the present invention, the term "basic compound" refers to a compound that is defined as a base by any one or more from among the definition of Arrhenius, the definition of Bronsted, and the definition of Lewis (an Arrhenius base, Bronsted base, or Lewis base). The basic compound desirably has a base dissociation constant pKb of greater than or equal to 4.00, preferably greater than or equal to 6.00. The pKb is less than or equal to 12.00, for example.

The base dissociation constant pKb of the compound can be measured by the following method at a liquid temperature of 25° C., for example.

A 60 mg quantity of the compound is dissolved in solvent in which the compound is soluble (for example, mixed solvent of tetrahydrofuran (THF) and water in a volumetric ratio of THF:water=6:4) to prepare a sample solution. The sample solution that has been prepared is subjected to neutralization titration with 0.1 N (0.1 mol/L) hydrochloric acid that has been factor calibrated. The droplet quantity (unit: mL) of the hydrochloric acid is read at the neutralization point on a titration curve. The pH at half the droplet quantity of the amount of titrated hydrochloric acid is adopted as the pKb of the compound.

In one embodiment, the basic compound is contained in at least the magnetic layer.

In one embodiment, the basic compound is an amine.

In one embodiment, the amine is at least one selected from the group consisting of organic tertiary amines and organic secondary amines.

In one embodiment, the amine is a trialkylamine.

In one embodiment, the average primary particle size of the carbon black falls within a range of 20 nm to 150 nm.

In one embodiment, the magnetic layer contains 0.10 weight part to 5.00 weight parts of carbon black per 100.00 weight parts of ferromagnetic powder.

An aspect of the present invention can provide a magnetic recording medium that is capable of stable running in a magnetic recording reproduction device.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a magnetic recording medium, which comprises a nonmagnetic layer comprising nonmagnetic powder and binder on a nonmagnetic support, and a magnetic layer comprising ferromagnetic powder and binder on the nonmagnetic layer, wherein the magnetic layer further comprises carbon black; and a state in which the carbon black is present, as observed in a reflection electron image of a surface of the magnetic layer obtained by a scanning electron microscope, satisfies condition 1 and condition 2 below:

condition 1: a number of carbon black particles with a particle size of greater than or equal to 140 nm is greater than or equal to 30 per 1,000 $\mu m^2$ of area; and condition 2: a number of carbon black particles with a particle size of greater than or equal to 220 nm is less than or equal to 10 per 1,000 $\mu m^2$ of area.

The above magnetic recording medium will be described in detail below.

<Magnetic Layer>

(Carbon Black)

The state in which the carbon black is present in the magnetic layer satisfies condition 1 and condition 2. The number of carbon black particles with a particle size of greater than or equal to 140 nm that is specified by condition 1 is greater than or equal to 30 per 1,000 $\mu m^2$ area of the surface of the magnetic layer. The presumptions of the present inventors with regard to the number of the above carbon black particles of greater than or equal to 30 is as set forth above. A number of greater than or equal to 32 is desirable. From the perspective of electromagnetic characteristics, the ratio (fill rate) accounted for by ferromagnetic powder in the magnetic layer is desirably high, while the ratio accounted for by carbon black as a nonmagnetic component is relatively low. Since the carbon black particles with a particle size of greater than or equal to 140 nm include the carbon black particles with particle size greater than or equal to 220 nm that are specified by condition 2, reducing the number of carbon black particles with a particle size greater than or equal to 220 nm that is specified by condition 2 is also desirable in order to reduce the number of carbon black particles with a particle size greater than or equal to 140 nm that is specified by condition 1. From these perspectives, the number of carbon black particles with a particle size greater than or equal to 140 nm that is specified by condition 1 is desirably less than or equal to 90 and preferably less than or equal to 70.

The number of carbon black particles with a particle size that is greater than or equal to 220 nm that is specified by condition 2 is less than or equal to 10 per 1,000 $\mu m^2$ area of the surface of the magnetic layer. The presumptions of the present inventors with regard to the number of the above carbon black particles of less than or equal to 10 are also as set forth above. From the perspective of further improving running stability, the number of carbon black particles with a particle size of greater than or equal to 220 nm that is specified by condition 2 is desirably less than or equal to 9, preferably less than or equal to 8, more preferably less than or equal to 7, still more preferably less than or equal to 6, and yet more preferably, less than or equal to 5. This number can also be 0.

From the perspective of states of carbon black satisfying conditions 1 and 2, particularly the presence of carbon black in the magnetic layer in a state satisfying condition 1, the average primary particle size is desirably greater than or equal to 20 nm, preferably greater than or equal to 30 nm. From the perspective of states satisfying conditions 1 and 2, particularly the presence of carbon black in the magnetic layer in a state satisfying condition 2, the average primary particle size of the carbon black is desirably less than or equal to 150 nm, desirably less than or equal to 100 nm. The term "average primary particle size of the carbon black" is the average particle size as determined by the method set forth further below. However, it is possible to specify condition 1 and condition 2 with carbon black having an average primary particle size falling outside the above ranges by adopting one or more of the means set forth further below, for example. Accordingly, the average primary particle size of the carbon black contained in the magnetic layer is not limited to the above ranges.

From the perspective of states satisfying conditions 1 and 2, particularly the presence of carbon black in the magnetic layer in a state satisfying condition 1, the content of carbon black in the magnetic layer is desirably greater than or equal to 0.10 weight parts, preferably greater than or equal to 0.15 weight parts, per 100.00 weight parts of ferromagnetic powder. From the perspective of states satisfying conditions 1 and 2, particularly the presence of carbon black in the magnetic layer in a state satisfying condition 2, the content of carbon black in the magnetic layer is desirably less than or equal to 5.00 weight parts, preferably less than or equal to 2.00 weight parts, per 100.00 weight parts of ferromagnetic powder.

Examples of means of causing carbon black to be present in the magnetic layer in a state that satisfies conditions 1 and 2 are: one or a combination of two or more of the various means described in paragraphs 0022 to 0030 of Japanese Unexamined Patent Publication (KOKAI) No. 2010-231843, which is expressly incorporated herein by reference in its entirety, including adjusting the dispersion conditions of the composition (coating liquid) for forming the magnetic layer; adjusting the calendering conditions (calendering conditions such as the calender roll temperature, processing speed, and pressure); and surface treating the magnetic layer surface. The method (the method of conducting a surface treatment by rubbing together the surfaces of running magnetic recording media) described in Japanese Unexamined Patent Publication (KOKAI) No. 2007-287310, which is expressly incorporated herein by reference in its entirety, can be used for surface treating the surface of the magnetic layer. Reference can be made to paragraphs 0018 to 0062 and to all of the drawings of Japanese Unexamined Patent Publication (KOKAI) No. 2007-287310 with regard to the above surface treatment. The thicker the nonmagnetic layer and the magnetic layer are made, the smaller the number of carbon black particles greater than or equal to 140 nm in particle size and the smaller the number of carbon black particles greater than or equal to 220 nm in size tend to be. This is thought to be because the thicker the nonmagnetic layer and the magnetic layer become, the greater the tendency for the carbon black to be pushed into the interior of the magnetic layer (toward the nonmagnetic layer) from the surface of the magnetic layer by the calendering that is normally conducted in the process of manufacturing a magnetic recording medium. Accordingly, it is also possible to control the state in which the carbon black is present in the magnetic layer to a state satisfying conditions 1 and 2 by adjusting the thickness of the nonmagnetic layer and/or magnetic layer.

(Basic Compound)

The magnetic layer can comprise carbon black, ferromagnetic powder, binder, and one or more optional components. One component that can be contained in the magnetic layer is a basic compound, for example. One or more basic compounds can be incorporated. As set forth above, the substance that may cause the running stability to decrease is thought to be an acidic compound. Accordingly, the present inventors presume that the incorporation of a basic compound that can neutralize the acidic compound is desirable to further improve running stability. The basic compound is not limited beyond having the pKb set forth above. A desirable example of a basic compound is an amine. The amine can be a monoamine, diamine, triamine, primary amine, secondary amine, tertiary amine, aliphatic amine, alicyclic amine, or aromatic amine. Examples are trioctylamine, triethylamine, DBEDA (N,N'-di-tert-butylethylenediamine), TBDETA (tetrabutyldiethylenetriamine), PMDETA (pentamethyldiethylenetriamine), TMEEA (tris (2-(2methoxyethoxy)ethyl)amine), 1,8-diabicyclo[5,4,0]undeca-7-ene, 3-dimethylaminopropanol, N-ethyldiisopropylamine, tridodecylamine, triheptylamine, triisopropanol, trihexylamine, N,N-dimethyldodecylamine, N-butyldiethanolamine, tributylamine, triethanolamine, tripropylamine, stearyldiethanolamine, 3-diethylamino-1,2-propanediol, N,N,N'',N''-tetraisopropyldiethylenetriamine, triamylamine, and various other organic amines. Examples of desirable organic amines are secondary diamines, tertiary monoamine, aliphatic amines, and alicyclic amines. Examples of preferred amines are aliphatic secondary diamines, aliphatic tertiary monoamines, and alicyclic tertiary amines. From the perspective of achieving conditions 1 and 2, particularly condition 2, by increasing the dispersion of the carbon black in the composition (coating liquid) for forming the magnetic layer, organic tertiary amines are desirably employed as the amine. Examples of desirable organic tertiary amines are aliphatic tertiary monoamines and alicyclic tertiary amines. Reference can be made to paragraphs 0013 to 0018 in Japanese Unexamined Patent Publication (KOKAI) No. 2013-49832, which is expressly incorporated herein by reference in its entirety, for details in this regard. Japanese Unexamined Patent Publication (KOKAI) No. 2013-49832 discloses the organic tertiary amines of this publication as components for enhancing the dispersion of carbon black, but does not even suggest that the use of amines is desirable from the perspective of improving running stability, which has been discovered by the present inventors.

Trialkylamines are preferred as the above amine. The alkyl groups that are present in trialkylamines desirably have 1 to 18 carbon atoms. The three alkyl groups that are present in a trialkylamine can be identical or different. Reference can be made to paragraphs 0015 and 0016 of Japanese Unexamined Patent Publication (KOKAI) No. 2013-49832 for details regarding alkyl groups. Trioctylamines are particularly desirable as trialkylamines. Because trioctylamines have low volatility, they are thought to effectively participate in enhancing the dispersion of carbon black and neutralizing acidic compounds in the magnetic layer.

The content of basic compounds in the magnetic layer or in the composition for forming the magnetic layer desirably falls within a range of 1.00 weight part to 50.00 weight parts, preferably within a range of 1.00 weight part to 20.00 weight parts, per 100.00 weight parts of carbon black.

(Acidic Compound)

As set forth above, the present inventors presume that acidic compounds are the components that may cause the drop in running stability. In one embodiment, acidic compounds are contained in the magnetic layer. In another embodiment, they are contained in the nonmagnetic layer. In yet another embodiment, they are contained in both the magnetic layer and nonmagnetic layer. For example, an aspect of the present invention also covers embodiments in which a composition for forming the nonmagnetic layer containing an acidic compound is used to form the nonmagnetic layer, a composition for forming the magnetic layer not containing an acidic compound is used to form the magnetic layer, and subsequent migration from the nonmagnetic layer to the magnetic layer causes the magnetic layer to contain the acidic compound. One or more types of acidic compounds can be contained in the magnetic layer, nonmagnetic layer, or magnetic and nonmagnetic layers.

The acid dissociation constant pKa of acidic compounds is as set forth above. Examples of acidic compounds are the various compounds employed as dispersing agents of ferromagnetic powders and/or nonmagnetic powders. One or more acidic compounds can be contained. An example of such acidic compounds is phosphorus-based compounds. A more specific example is phosphonic acid-based compounds. Examples of structures that bond to the phosphonic acid structure set forth above in phosphonic acid-based compounds are aromatic groups and alkyl groups. Specific examples of phosphonic acid-based compounds are phenylphosphonic acid, benzylphosphonic acid, phenethylphosphonic acid, $\alpha$-methylbenzylphosphonic acid, 1-methyl-1-phenyethylphosphonic acid, diphenylmethylphosphonic acid, biphenylphosphonic acid, benzylphenylphosphonic acid, $\alpha$-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, and other aromatic ring-containing organic phosphonic acids and their alkali metal salts; octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, and other alkylphosphonic acids and their alkali metal salts. The content of acid compounds in the magnetic layer or composition for forming the magnetic layer falls, for example, within a range of 0.10 weight part to 50.00 weight parts, desirably within a range of 0.50 weight part to 10.00 weight parts, per 100.00 weight parts of ferromagnetic powder.

(Ferromagnetic Powder)

From the perspective of increasing the recording density, it is desirable for the average particle size of the ferromagnetic powder contained in the magnetic layer to be less than or equal to 50 nm, preferably less than or equal to 40 nm, and more preferably, less than or equal to 30 nm. From the perspective of the stability of magnetization, it is desirable for the average particle size to be greater than or equal to 10 nm, preferably greater than or equal to 20 nm. From the perspective of causing the carbon black to be present in the magnetic layer in a state that satisfies condition 1, it is desirable for the ferromagnetic powder to be separately dispersed from the carbon black and then mixed during preparation of the composition for forming the magnetic layer. As set forth further below, it is desirable for the ferromagnetic powder, carbon black, and abrasive to be separately dispersed and then mixed in an embodiment in which the magnetic layer contains abrasive.

The average particle size of various powders such as ferromagnetic powder in the present invention is a value measured by the following method. The average primary particle size of carbon black set forth above is also a value measured by the following method.

Powder the average particle size is to be measured is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle, as set forth above.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder from a magnetic layer or a nonmagnetic layer for an average particle size measurement.

In the present invention, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the above ferromagnetic powder is hexagonal ferrite powder. For details regarding hexagonal ferrite powder, reference can be made to, for example, paragraphs 0134 to 0136 of Japanese Unexamined Patent Publication (KOKAI) No. 2011-216149, which is expressly incorporated herein by reference in its entirety.

A specific desirable example of the ferromagnetic powder is ferromagnetic metal powder. Reference can be made to paragraphs 0137 to 0141 of Japanese Unexamined Patent Publication (KOKAI) No. 2011-216149, for example, for details regarding ferromagnetic metal powder.

The content (fill rate) of ferromagnetic powder in the magnetic layer desirably falls within a range of 50 weight percent to 90 weight percent, preferably within a range of 60 weight percent to 90 weight percent. A high fill rate is desirable from the perspective of increasing the recording density.

(Binder)

The magnetic layer contains binder along with ferromagnetic powder. Various resins that are commonly employed as binders in particulate magnetic recording media can be employed without limitation as the binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder. Among these, desirable resins are polyurethane resin, acrylic resins, cellulose resins, and vinyl chloride resins, and preferable resins are polyurethane resin and vinyl chloride resins. These resins can also be employed as binders in the nonmagnetic layer described further below.

Reference can be made to paragraphs 0028 to 0031 of Japanese Unexamined Patent Publication (KOKAI) No. 2010-24113, which is expressly incorporated herein by reference in its entirety, with regard to the above binder. The quantity of binder falls, for example, within a range of 5.00 weight parts to 50.00 weight parts, desirably a range of 10.00 weight parts to 30.00 weight parts, per 100.00 weight parts of ferromagnetic powder.

(Components that can be Added to the Magnetic Layer)

In addition to the above-described components, one or a combination of two or more known additives can be incorporated in any quantities. Known curing agents (crosslinking agents) can also be employed to form the magnetic layer. The use of curing agents is desirable to increase the strength of the magnetic layer. From the perspective of its crosslinking property and the like, polyisocyanate is desirable as a curing agent. Reference can be made to paragraphs 0124 and 0125 of Japanese Unexamined Patent Publication (KOKAI) No. 2011-216149 for details regarding polyisocyanate. The content of curing agent in the magnetic layer is, for example, 0 to 80.00 weight parts, and from the perspective of increasing the strength of the magnetic layer, desirably 50.00 weight parts to 80.00 weight parts, per 100.00 weight parts of binder.

It is desirable to add an abrasive to the magnetic layer to maintain the running durability by removing material adhering to the head during running. Examples of abrasives are: alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond powder. Of these, alumina and silicon carbide are desirable, alumina is preferred, and α-alumina is of greater preference. These abrasives can be of any shape, such as acicular, spherical, or cubic. A shape having an angular portion is desirable for high abrasiveness. The average particle size of the abrasive is desirably greater than or equal to 14 $m^2/g$, preferably greater than or equal to 16 $m^2/g$, and more preferably, greater than or equal to 18 $m^2/g$, as the specific surface area ($S_{BET}$) measured by the BET method. The $S_{BET}$ of the abrasive is desirably less than or equal to 40 $m^2/g$ from the perspective of inhibiting head abrasion. The content of abrasive in the magnetic layer is desirably 1.00 weight part to 20.00 weight parts, preferably 2.00 weight parts to 15.00 weight parts, per 100.00 weight parts of ferromagnetic powder. From the perspective of causing carbon black to be present in the magnetic layer in a state satisfying condition 1 set forth above, it is desirable for the abrasive and carbon black to be separately dispersed and then added, and preferably for the abrasive, carbon black, and ferromagnetic powder to be separately dispersed and then mixed during preparation of the composition for forming the magnetic layer.

As needed, one or a combination of two or more additives having dispersing effects, lubricating effects, antistatic effects, plasticizing effects, or the like can be used in any quantity in the magnetic layer. Reference can be made to paragraphs 0049 and 0050 of Japanese Unexamined Patent Publication (KOKAI) No. 2009-054270, which is expressly incorporated herein by reference in its entirety, for example, with regard to such additives.

<Nonmagnetic Layer>

(Nonmagnetic Powder)

Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to paragraphs 0035 to 0041 of Japanese Unexamined Patent Publication (KOKAI) No. 2011-216149, for details in this regard. The content of nonmagnetic powder in the nonmagnetic layer desirably falls within a range of 50 weight percent to 90 weight percent, preferably within a range of 60 weight percent to 90 weight percent.

Binders, lubricants, dispersing agents, other additives, solvents, dispersing methods, and the like of the magnetic layer can be applied to the nonmagnetic layer. In particular, known techniques relating to magnetic layers as regards quantities and types of binders, and addition quantities and types of additives, can be applied.

(Binder)

The binder that is contained in the nonmagnetic layer is as described for the binder that is contained in the magnetic layer above. The content of binder in the nonmagnetic layer falls, for example, within a range of 5.00 weight parts to 50.00 weight parts, desirably within a range of 10.00 weight parts to 30.00 weight parts, per 100.00 weight parts of nonmagnetic powder.

(Components that can be Added to the Nonmagnetic Layer)

In addition to the components set forth above, one or a combination of two or more known additives can be incorporated in any quantity into the nonmagnetic layer. In a desirable embodiment, from the perspective of enhancing dispersion of the nonmagnetic powder, the acidic compounds set forth above are incorporated in the nonmagnetic layer. The content of the acidic compounds in the nonmagnetic layer, or in the composition for forming the nonmagnetic layer, falls, for example, within a range of 0.10 weight part to 50.00 weight parts, desirably within a range of 0.10 weight part to 10.00 weight parts, per 100.00 weight parts of nonmagnetic powder. Known curing agents (crosslinking agents) can be used to form the nonmagnetic layer. Details regarding curing agents are as set forth above for the magnetic layer. The quantity of curing agent in the nonmagnetic layer is, for example, 0 to 80.00 weight parts, and from the perspective of increasing the strength of the nonmagnetic layer, desirably 50.00 weight parts to 80.00 weight parts, per 100.00 weight parts of binder.

The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

(Nonmagnetic Support)

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like.

<Layer Configuration>

The thickness configuration of the magnetic recording medium is such that the thickness of the nonmagnetic support is desirably 3.00 µm 80.00 µm, preferably 3.00 µm to 50.00 µm, and more preferably, 3.00 µm to 10.00 µm.

The thickness of the magnetic layer can be optimized based on the saturation magnetization level of the magnetic head employed, the size of the head gap, and the bandwidth of the recording signal. To achieve higher density recording, it is desirably 0.01 µm to 0.10 µm, preferably 0.02 µm to 0.09 µm. The magnetic layer need only comprise a single layer, but can also be separated into two or more layers having different electromagnetic characteristics. Known configurations relating to magnetic layers with multiple layers can be applied.

The thickness of the nonmagnetic layer is, for example, 0.05 µm to 2.00 µm, desirably 0.07 µm to 1.00 µm, and preferably 0.10 µm to 0.50 µm.

<Backcoat Layer>

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.90 µm, preferably 0.10 µm to 0.70 µm.

<Process of Manufacturing the Magnetic Recording Medium>

The process of manufacturing the magnetic recording medium will be described in greater detail below.

(Composition for Forming the Magnetic Layer)

The composition (coating liquid) for forming the magnetic layer normally contains solvent in addition to the various compounds set forth above. Examples of the solvent are the organic solvents that are commonly employed to manufacture particulate magnetic recording media. Specific examples that can be employed are, in any proportions: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorhydrin, dichlorobenzene, and other chlorinated hydrocarbons; N,N-dimethyl formamide; and hexane. When employing the desirable organic tertiary amines set forth above in a nonmagnetic layer containing carbon black for enhancing the dispersion of carbon black and causing carbon black to be present in the magnetic layer in a state satisfying condition 1, It is desirable to employ at least one organic solvent selected from the group consisting of methyl ethyl ketone, cyclohexanone, isophorone, and ethanol as the solvent in the composition for forming the magnetic layer. The content of the solvent in the composition for forming the magnetic layer falls, for example, within a range of 100.00 weight parts to 800.00 weight parts, desirably within a range of 200.00 weight parts to 600.00 weight parts, per 100.00 weight parts of ferromagnetic powder.

The process of preparing the composition for forming the magnetic layer and the compositions for forming the various layers such as the nonmagnetic layer normally comprise a kneading step and a dispersing step, as well as a mixing step that can be conducted as needed before or after these steps. The individual steps can each be subdivided into two or more stages. All of the starting materials, such as the ferromagnetic powder, nonmagnetic powder, binder, carbon black, various additives, and solvent can be added at the outset, or part way through, any of the steps. Individual starting materials can be added in increments in two or more steps. The composition for forming the magnetic layer is desirably prepared by separately dispersing and preparing a dispersion containing the ferromagnetic powder (magnetic liquid), a dispersion containing the carbon black (carbon black liquid), and a dispersion containing the abrasive (abrasive liquid), and then simultaneously or successively mixing them. Part or all of the lubricants, curing agents, and solvents can be added to a mixed solution obtained by mixing the magnetic liquid, carbon black liquid, and abrasive liquid. When employing the basic compound set forth above as a component of the composition for forming the magnetic layer, the basic compound can be added at any stage. In one embodiment, it is added as a component of the carbon black liquid. However, it is also desirably added after mixing the magnetic liquid, carbon black liquid, and abrasive liquid. Reference can be made to paragraph 0065 of Japanese Unexamined Patent Publication (KOKAI) No. 2010-231843 with regard to preparation of the compositions for forming the various layers.

(Composition for Forming the Nonmagnetic Layer)

The nonmagnetic layer can be formed, for example, by directly coating the composition (coating liquid) for forming the nonmagnetic layer on the surface of a nonmagnetic support. The composition for forming the nonmagnetic layer normally contains a solvent in addition to the various components set forth above. The solvent is as set forth above. Additionally, reference can be made to the above description regarding the composition for forming the magnetic layer for details on preparing the composition for forming the nonmagnetic layer. Reference can also be made to the above description regarding the composition for forming the magnetic layer for details on preparing the composition (coating liquid) for forming the back coat layer.

(Coating Step)

The magnetic layer can be formed by sequentially or simultaneously multilayer coating the composition for forming the magnetic layer and the composition for forming the nonmagnetic layer. Reference can be made to paragraph 0066 of Japanese Unexamined Patent Publication (KOKAI) No. 2010-231843 for details regarding coating to form various layers.

(Other Steps)

Reference can be made to paragraphs 0067 to 0070 of Japanese Unexamined Patent Publication (KOKAI) No. 2010-231843 for various other steps regarding the manufacturing of magnetic recording media. Reference can be made to Japanese Unexamined Patent Publication (KOKAI) No. 2007-287310, as set forth above, with regard to surface treating the surface of the magnetic layer.

The magnetic recording medium of an aspect of the present invention as set forth above can exhibit good running stability, and more particularly, good straight running stability. The magnetic recording medium of an aspect of the present invention is desirably a magnetic tape. The ability of a magnetic recording medium to achieve stable running in a magnetic recording and reproduction device (drive) is desirable from the perspective of increasing the recording density in the width direction (direction perpendicular to the longitudinal direction of the tape). For example, the magnetic recording medium of an aspect of the present invention can be suitably employed in a magnetic recording and reproduction device with a narrow recording track width of 1.00 μm to 10.00 μm. The reproduction track width (track width of the reproduction head) desirably falls within a range of 0.25 μm to 4.00 μm from the perspective of reducing dropout during the reproduction of information recorded at a narrow track width. On the surface of the magnetic layer, the presence of a large number of carbon black particles with a particle size greater than or equal to about half the reproduction track width has been considered by the present inventors to be a cause of an increased error rate. Accordingly, in a magnetic recording and reproduction device employing a reproduction head with a track width of about 0.50 μm (for example, about 0.40 μm to 0.60 μm) as the reproduction track width, for example, having the magnetic recording medium satisfying condition 2 is presumed by the present inventors to contribute to reducing the error rate. Reference can be made to paragraphs 0072 and 0073 of Japanese Unexamined Patent Publication (KOKAI) No. 2010-231843 with regard to a recording and reproduction system that is suited to application to the magnetic recording medium of the present invention.

EXAMPLES

The present invention will be described in greater detail below through Examples. However, the present invention is not limited to the embodiments shown in Examples. The "parts" indicated below denotes "weight parts".

<Measuring the pKa and pKb of the Compounds>

The pKa and pKb of the compounds listed in Table 1 below were measured by the methods set forth above. The mixed solvent of tetrahydrofuran (THF) and water (volumetric ratio THF:water=6:4) was employed as the measurement solvent. Portions of the compounds prepared for addition to the composition for forming the magnetic layer or the composition for forming the nonmagnetic layer were collected for use as measurement samples.

TABLE 1

| | |
|---|---|
| Phenylphosphonic acid | pKa = 3.93 |
| Trioctylamine | pKb = 6.49 |
| N,N'-di-tert-butylethylenediamine | pKb = 6.02 |

Example 1

1. Formulas of Compositions for Forming Various Layers

The formulas of the compositions for forming the various layers are given in Tables 2 to 4.

TABLE 2

Composition for forming the magnetic layer

Magnetic liquid

| | |
|---|---|
| Ferromagnetic powder: ferromagnetic hexagonal barium ferrite powder (average particle size: 27 nm, coercive force Hc: 175 kA/m (2,200 Oe) | 100.00 parts |
| Dispersing agent: oleic acid (pKa as measured by the above method: 7.41) | 2.00 parts |
| Binder: vinyl chloride copolymer (MR-104 made by Zeon Corporation) | 10.00 parts |
| Binder: sulfonic acid group-containing polyester polyurethane resin (UR-4800 made by Toyobo) | 4.00 parts |
| Solvent: methyl ethyl ketone | 150.00 parts |
| Solvent: cyclohexanone | 150.00 parts |

Abrasive liquid

| | |
|---|---|
| Abrasive: α-alumina with specific surface area $S_{BET}$ of 19 m²/g | 6.00 parts |
| Binder: sulfonic acid group-containing polyester polyurethane resin (UR-4800 made by Toyobo) | 0.60 part |
| Solvent: cyclohexanone | 23.00 parts |

Carbon black liquid

| | |
|---|---|
| Carbon black (average primary particle size: 80 nm) | 0.50 part |
| Basic compound: trioctylamine (Farmin (Japanese registered trademark) T08 made by Kao) | 0.05 part |
| Solvent: cyclohexanone | 4.50 parts |

Lubricant•Curing agent liquid

| | |
|---|---|
| Lubricant: stearic acid (pKa measured by the above method: 7.39) | 2.00 parts |
| Lubricant: amide stearate | 0.30 part |
| Lubricant: butyl stearate | 6.00 parts |
| Solvent added to finish: methyl ethyl ketone | 110.00 parts |
| Solvent added to finish: cyclohexanone | 110.00 parts |
| Polyisocyanate (Coronate (Japanese registered trademark) L made by Nippon Polyurethane Industry | 3.00 parts |

TABLE 3

Composition for forming nonmagnetic layer

| | |
|---|---|
| Nonmagnetic powder: iron oxide (Colcothar) (Average particle size: 0.15 μm, average acicular ratio: 7, specific surface area $S_{BET}$: 52 m²/g) | 75.00 parts |
| Nonmagnetic powder: carbon black (Average primary particle size: 16 nm, DBP(dibutyl phthalate) oil absorption capacity: 74 cm³/100 g) | 25.00 parts |
| Dispersing agent: phenylphosphonic acid | 3.00 parts |
| Binder: vinyl chloride copolymer (MR-104 made by Zeon Corp.) | 12.00 parts |
| Binder: sulfonic acid group-containing polyester polyurethane resin (UR-8401 made by Toyobo) | 8.00 parts |
| Solvent: methyl ethyl ketone | 370.00 parts |
| Solvent: cyclohexanone | 370.00 parts |
| Lubricant: stearic acid | 1.00 part |
| Lubricant: amide stearate | 0.30 part |

TABLE 3-continued

Composition for forming nonmagnetic layer

| | |
|---|---|
| Lubricant: butyl stearate | 2.00 parts |
| Curing agent: polyisocyanate | 5.00 parts |
| (Coronate L made by Nippon Polyurethane Industry) | |

TABLE 4

Composition for forming back coat layer

| | |
|---|---|
| Carbon black | 100.00 parts |
| (Average primary particle size: 40 nm, DBP oil absorption capacity: 74 cm³/100 g) | |
| Nonmagnetic powder: α-alumina powder | 1.00 part |
| (Specific surface area $S_{BET}$: 17 m²/g) | |
| Dispersing agent: copper phthalocyanine | 3.00 parts |
| Binder: nitrocellulose | 3.00 parts |
| Binder: Sulfonic acid group-containing polyester polyurethane resin | 60.00 parts |
| (UR-8401 made by Toyobo) | |
| Binder: Polyester resin (Vylon (Japanese registered trademark) | 4.00 parts |
| 500 made by Toyobo) | |
| Curing agent: Polyisocyanate | 15.00 parts |
| (Coronate L made by Nippon Polyurethane Industry) | |
| Solvent: methyl ethyl ketone | 600.00 parts |
| Solvent: toluene | 600.00 parts |

2. Preparation of Compositions for Forming Various Layers (1) Preparation of Composition for Forming the Magnetic Layer The above magnetic liquid was kneaded and dilution processed in an open kneader. Subsequently, zirconia (ZrO₂) beads 0.1 mm in particle diameter (referred to as "Zr beads", hereinafter) were used to conduct 30 passes of dispersion processing, each pass consisting of a retention time of 2 minutes, at a bead fill rate of 80 volume % and a rotor tip peripheral speed of 10 m/s in a horizontal bead mill disperser.

The abrasive liquid was prepared as a mixture of alumina: sulfonic acid group-containing polyester polyurethane resin (UR-4800 made by Toyobo):cyclohexanone=60:6:230 (weight ratio). This mixture was then charged to a horizontal bead mill disperser with Zr beads 0.3 mm in diameter and adjusted to a bead volume/(abrasive liquid volume+bead volume) of 80%, and bead mill dispersion processed for 120 minutes. Following this processing, the liquid was removed and subjected to ultrasonic dispersion filtration processing with a flow-type ultrasonic dispersion filtration device.

The carbon black liquid was prepared by the processing method set forth below. It was liquefied by ultrasonic treatment for 6 hours at a stirring rotational speed of 1,500 rpm in a batch-type ultrasonic dispersion device with stirrer. The liquefied carbon black liquid was then subjected to 6 passes of dispersion processing, each pass consisting of a retention time of 2 minutes, at a bead fill rate of 80 volume % and a rotary tip peripheral speed of 10 m/s in a horizontal bead mill disperser using Zr beads 0.5 mm in particle diameter. The liquid was then stirred for 30 minutes at a peripheral speed of 10 m/s in a dissolver stirring device, and then subjected to 3 passes through a flow-type ultrasonic disperser at a flow rate of 3 kg/min.

The magnetic liquid, carbon black liquid, and abrasive liquid were charged with other components in the form of the lubricant, curing agent, and finishing solvents to a dissolver stirring device and stirred for 30 minutes at a peripheral speed of 10 m/s. Subsequently, the mixture was subjected to 3 passes through a flow-type ultrasonic disperser at a flow rate of 7.5 kg/min and filtered through a filter with a pore diameter of 1 μm to obtain the composition for forming the magnetic layer.

(2) Preparation of the Composition for Forming the Nonmagnetic Layer

The lubricants (stearic acid, amide stearate, and butyl stearate) and the polyisocyanate aside, the components shown in Table 3 were kneaded and dilution processed in an open kneader and then dispersion processed in a horizontal bead mill disperser. Subsequently, the lubricants (stearic acid, amide stearate, and butyl stearate) and the polyisocyanate were added and the mixture was subjected to stirring and mixing in a dissolver stirring device to prepare the composition for forming the nonmagnetic layer.

(3) Preparation of the Composition for Forming the Back Coat Layer

The polyisocyanate aside, the components shown in Table 4 were charged to a dissolver stirring device and stirred for 30 minutes at a peripheral speed of 10 m/s. The mixture was then dispersion processed in a horizontal bead mill disperser. Subsequently, the polyisocyanate was added and the mixture was stirred and mixed in a dissolver stirring device to prepare the composition for forming the back coat layer.

3. Fabrication of Magnetic Tape

The composition for forming the nonmagnetic layer was coated and dried on a polyethylene naphthalate support 6.00 μm in thickness to a dry thickness of 0.10 μm, after which the composition for forming the back coat layer was coated and dried to a dry thickness of 0.50 μm on the opposite surface of the support. The support was wound once on a winding roll and heat treated for 36 hours in a 70° C. environment. Following the heat treatment, over the nonmagnetic layer, the composition for forming the magnetic layer was coated and dried to a dry thickness of 0.07 μm. Subsequently, a surface smoothing treatment was conducted at a calender roll temperature of 100° C. at a linear pressure of 300 kg/cm (294 kN/m) and at a speed of 40 m/min with a calender comprised of metal rolls. Subsequently, a heat treatment was conducted for 36 hours in a 70° C. environment. Following the heat treatment, the product was slit to ½ inch width.

Next, the surface treatment disclosed in Japanese Unexamined Patent Publication (KOKAI) No. 2007-287310 in which magnetic layers are rubbed together (the embodiment disclosed in FIGS. 1 and 2 of Japanese Unexamined Patent Publication (KOKAI) No. 2007-287310) was conducted. The surface treatment was conducted at a line speed of 400 m/min with mobile rollers 10 mm in diameter in a processing environment at a temperature of 23° C. and a relative humidity of 50% to obtain a magnetic recording medium (magnetic tape). The properties of the magnetic recording medium thus obtained were evaluated by the following evaluation methods.

4. Evaluation of State in which Carbon Black was Present on the Surface of the Magnetic Layer (Evaluation of Conditions 1 and 2)

The number of carbon black particles on the surface of the magnetic layer was measured by the method set forth above using a scanning electron microscope (SEM: FE-SEM S4800 made by Hitachi Corp.). In addition to the number of carbon black particles having the sizes specified by conditions 1 and 2, the numbers of carbon black particles with a particle size of greater than or equal to 100 nm and greater than or equal to 300 nm were also measured.

The mode employed to measure the reflection electron image was the LA50 BSE (backscattered electron) mode. The carbon black particles were determined and binary processed by the following methods.

A. Determination of Carbon Black Particles

This was implemented by the following procedure with an energy dispersive X-ray spectrometer (EMAX made by Horiba Corp.).
(1) Particles determined to be black particles in the image data of a reflection electron image obtained by SEM were visually identified.
(2) Points were matched (magnification: 20,000-fold) to particles determined to be black particles in (1) above in a SEM screen displaying the same image data as in (1) above.
(3) Constituent elements were detected in SEM point & ID modes. In this process, the region outside the black particles was also simultaneously detected and a carbon black particle was identified when the detection ratio of elemental carbon was greater than or equal to twice that of the external region.
(4) The procedure of (1) to (3) above was implemented for 10 screens of reflection electron image obtained.

B. Binary Processing

The following procedure was implemented using image analysis software in the form of WinROOF created by Mitani Corporation.
(1) The image data of the reflection electron image obtained in A. above were dragged and dropped into WinROOF image analysis software.
(2) On the image, excluding portions displaying the magnification and scale, regions measuring 10 µm in height by 10 µm in width in actual size (actual dimensions) were selected as analysis regions.
(3) The analysis regions were binary processed to obtain binary images. Specifically, a lower limit of gradation 0 and an upper limit of gradation 50 were selected among a total of 256 gradations and binary processing was conducted using these two thresholds.
(4) A corrected binary image that excluded particles that had not been identified as carbon black particles in A. above was obtained from the binary image.
(5) With WinROOF image analysis software, measurement→concentration characteristics→pixel numbers were executed on the corrected binary image. The area of each of the particles thus identified as carbon black was calculated. The area of each particle that was calculated was approximated as a circle and the diameter of the circle obtained by approximation was adopted as the particle size.
(6) The number of carbon black particles with a particle size greater than or equal to 140 nm, the number of carbon black particles with a particle size greater than or equal to 220 nm, the number of carbon black particles with a particle size greater than or equal to 100 nm, and the number of carbon black particles with a particle size greater than or equal to 300 nm in the analysis region (10 µm×10 µm) were calculated.
(7) The procedure of (1) to (6) above was implemented for 10 screens of the reflection electron image obtained by SEM while varying the position on the surface of the magnetic layer.

5. Evaluation of Running Stability (Straight Running Stability)

The level that could not be tracked by a magnetic recording and reproduction head was determined for an LTO (Japanese registered trademark) G6 (Linear Tape—Open Generation 6) drive made by Hewlett Packard for a vertically moving magnetic type by running a magnetic tape on a reel tester and obtaining a servo signal from the magnetic tape with a digital storage oscilloscope for analysis. The position error signal (PES) that was measured by the above method was the degree to which running stability (straight running stability) was affected. The smaller the value, the better the running stability (straight running stability) indicated. A PES value of less than or equal to 100 nm was determined to indicate the achievement of a good SNR in a magnetic recording and reproduction device in which the recording track had been narrowed; for example, a magnetic recording and reproduction device in which the recording track width had been narrowed to 1.00 µm to 10.00 µm.

Example 2

With the exception that the ultrasonic treatment processing time of the carbon black liquid of the composition for forming the magnetic layer in Example 1 was changed to 12 hours, a magnetic recording medium was fabricated by the same method as in Example 1.

Example 3

With the exception that the ultrasonic treatment processing time of the carbon black liquid of the composition for forming the magnetic layer in Example 1 was changed to 3 hours, a magnetic recording medium was fabricated by the same method as in Example 1.

Example 4

With the exception that the composition of the carbon black liquid of the composition for forming the magnetic layer in Example 1 was changed to carbon black (average primary particle size: 80 nm): 0.50 part; N,N'-di-tert-butylethylenediamine: 0.05 part; and cyclohexanone: 4.50 parts; a magnetic recording medium was fabricated by the same method as in Example 1.

Example 5

With the exception that the composition of the carbon black liquid of the composition for forming the magnetic layer in Example 1 was changed to carbon black (average primary particle size: 40 nm): 0.50 part and cyclohexanone: 4.50 parts, and the processing method was changed as set forth below, a magnetic recording medium was fabricated by the same method as in Example 1.
(Carbon Black Liquid Processing Method)

The carbon black was liquefied by ultrasonic treatment for 6 hours at a stirring rotational speed of 1,500 rpm in a batch-type ultrasonic dispersion device with stirrer. The liquefied carbon black liquid was then subjected to 12 passes of dispersion processing, each pass consisting of a retention time of 2 minutes, at a bead fill rate of 80 volume % and a rotary tip peripheral speed of 10 m/s in a horizontal bead mill disperser using Zr beads 0.1 mm in particle diameter. The liquid was then stirred for 30 minutes at a peripheral speed of 10 m/s in a dissolver stirring device, and subjected to 6 passes through a flow-type ultrasonic disperser at a flow rate of 3 kg/min.

Example 6

With the exception that the composition of the carbon black liquid of the composition for forming the magnetic layer in Example 1 was changed to carbon black (average primary particle size: 40 nm): 0.50 part and cyclohexanone: 4.50 parts; and the composition of the lubricant and curing agent liquid of the composition for forming the magnetic layer was changed to stearic acid: 2.00 parts, amide stearate: 0.30 part, butyl stearate: 6.00 parts, methyl ethyl ketone: 110.00 parts, cyclohexanone: 110.00 parts, polyisocyanate (Coronate L made by Nippon Polyurethane Industry): 3.00 parts, and trioctylamine (Farmin T08 made by Kao): 0.05 part, a magnetic recording medium was fabricated by the same method as in Example 1.

Example 7

With the exception that the composition for forming the nonmagnetic layer was coated and dried on the above polyethylene naphthalate support to a dry thickness of 0.40 μm, a magnetic recording medium was fabricated by the same method as in Example 1.

Example 8

With the exception that the composition for forming the nonmagnetic layer was coated and dried on the above polyethylene naphthalate support to a dry thickness of 0.70 μm, a magnetic recording medium was fabricated by the same method as in Example 1.

Comparative Example 1

With the exception that the composition of the carbon black liquid of the composition for forming the magnetic layer in Example 1 was changed to carbon black (average primary particle size: 80 nm): 0.50 part and cyclohexanone: 4.50 parts, a magnetic recording medium was fabricated by the same method as in Example 1.

Comparative Example 2

With the exception that the composition of the carbon black liquid of the composition for forming the magnetic layer in Example 1 was changed to carbon black (average primary particle size: 80 nm): 0.50 part, phenylphosphonic acid: 0.05 part, and cyclohexanone: 4.50 parts, a magnetic recording medium was fabricated by the same method as in Example 1.

Comparative Example 3

With the exception that the composition of the carbon black liquid of the composition for forming the magnetic layer in Example 1 was changed to carbon black (average primary particle size: 300 nm): 0.50 part and cyclohexanone: 4.50 parts, a magnetic recording medium was fabricated by the same method as in Example 1.

Examples 2 to 8 and Comparative Examples 1 to 3 were evaluated in the same manner as in items 4 and 5 of Example 1.

The results of the above are given in Table 5 below.

TABLE 5

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|
| (1) Preparation condition for composition for forming magnetic layer | Primary particle size of carbon black in magnetic layer | 80 nm | 80 nm | 80 nm | 80 nm | 40 nm | 40 nm | 80 nm | 80 nm | 80 nm | 80 nm | 300 nm |
| | Dispersion time of carbon black liquid | 6 hours | 12 hours | 3 hours | 6 hours | 6 hours | 6 hours | 6 hours | 6 hours | 6 hours | 6 hours | 6 hours |
| | Amine Liquid to which amine was added | TOA Carbon black liquid | TOA Carbon black liquid | TOA Carbon black liquid | DBEDA Carbon black liquid | None — | TOA Mixed liquid of magnetic liquid, carbon black liquid, and abrasive liquid | TOA Carbon black liquid | TOA Carbon black liquid | None — | None — | None — |
| (2) Thickness of nonmagnetic layer | | 0.10 μm | 0.10 μm | 0.10 μm | 0.10 μm | 0.10 μm | 0.10 μm | 0.40 μm | 0.70 μm | 0.10 μm | 0.10 μm | 0.10 μm |
| (3) Number of carbon black particles on the magnetic layer surface | Particle size 300 nm or greater | 0 | 0 | 0 | 0 | 1 | 1 | 0 | 0 | 1 | 1 | 1 |
| | Particle size 220 nm or greater (Condition 2: 10 or less) | 4 | 1 | 6 | 7 | 9 | 8 | 3 | 0 | 15 | 12 | 8 |
| | Particle size 140 nm or greater | 45 | 32 | 62 | 50 | 85 | 88 | 40 | 30 | 53 | 28 | 25 |

TABLE 5-continued

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|
| (Condition 1: 30 or greater) Particle size 100 nm or greater | 400 | 300 | 600 | 500 | 800 | 900 | 350 | 280 | 600 | 300 | 200 |
| (4) PES | 20 nm | 20 nm | 20 nm | 25 nm | 40 nm | 30 nm | 20 nm | 60 nm | 120 nm | 220 nm | 175 nm |

TOA: trioctylamine,
DBEDA: N,N'-di-tert-butylethylenediamine

Evaluation Results

Based on the results given in Table 5, Examples 1 to 8 were found to satisfy conditions 1 and 2, have PES values lower than those of Comparative Examples, and afford better running stability (straight running stability) than Comparative Examples.

The results of item (3) in Table 5 reveal a good correlation between the number of particles of carbon black having a particle size of greater than or equal to 140 nm (condition 1) and greater than or equal to 220 nm (condition 2) on the surface of the magnetic layer, and the results of PES evaluation.

The above results show that an aspect of the present invention can provide a magnetic recording medium affording good running stability (straight running stability).

An aspect of the present invention is useful in the field of manufacturing magnetic recording media for high-density recording, such as data backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a nonmagnetic layer comprising nonmagnetic powder and binder on a nonmagnetic support, and a magnetic layer comprising ferromagnetic powder and binder on the nonmagnetic layer, wherein the magnetic layer further comprises carbon black; and
the state in which the carbon black is present, as observed in a reflection electron image of a surface of the magnetic layer obtained by a scanning electron microscope, satisfies condition 1 and condition 2 below:

condition 1: the number of carbon black particles with a particle size of greater than or equal to 140 nm is greater than or equal to 32 but less than or equal to 88 per 1,000 $\mu m^2$ of area; and condition 2: the number of carbon black particles with a particle size of greater than or equal to 220 nm is greater than or equal to 1 but less than or equal to 9 per 1,000 $\mu m^2$ of area.

2. The magnetic recording medium according to claim 1, wherein at least either the magnetic layer or the nonmagnetic layer further comprises an acidic compound.

3. The magnetic recording medium according to claim 2, wherein the acidic compound is an acidic compound having an acid dissociation constant pKa of less than or equal to 6.00.

4. The magnetic recording medium according to claim 2, wherein the acidic compound is a phosphorus-based compound.

5. The magnetic recording medium according to claim 2, wherein the acidic compound is a phosphonic acid-based compound.

6. The magnetic recording medium according to claim 2, wherein at least either the magnetic layer or the nonmagnetic layer further comprises a basic compound.

7. The magnetic recording medium according to claim 6, wherein at least the magnetic layer comprises the basic compound.

8. The magnetic recording medium according to claim 6, wherein the basic compound is an amine.

9. The magnetic recording medium according to claim 8, wherein the amine is at least one selected from the group consisting of organic tertiary amines and organic secondary amines.

10. The magnetic recording medium according to claim 8, wherein the amine is a trialkylamine.

11. The magnetic recording medium according to claim 4, wherein at least either the magnetic layer or the nonmagnetic layer further comprises a basic compound, and the basic compound is an amine.

12. The magnetic recording medium according to claim 11, wherein at least the magnetic layer comprises the amine.

13. The magnetic recording medium according to claim 11, wherein the amine is at least one selected from the group consisting of organic tertiary amines and organic secondary amines.

14. The magnetic recording medium according to claim 11, wherein the amine is a trialkylamine.

15. The magnetic recording medium according to claim 5, wherein at least either the magnetic layer or the nonmagnetic layer further comprises a basic compound, and the basic compound is an amine.

16. The magnetic recording medium according to claim 15, wherein at least the magnetic layer comprises the amine.

17. The magnetic recording medium according to claim 15, wherein the amine is at least one selected from the group consisting of organic tertiary amines and organic secondary amines.

18. The magnetic recording medium according to claim 15, wherein the amine is a trialkylamine.

19. The magnetic recording medium according to claim 1, wherein the average primary particle size of the carbon black ranges from 20 nm to 150 nm.

20. The magnetic recording medium according to claim 1, wherein the magnetic layer comprises 0.10 weight part to 5.00 weight parts of carbon black per 100.00 weight parts of the ferromagnetic powder.

* * * * *